United States Patent
Sundaresan et al.

(10) Patent No.: US 12,493,412 B1
(45) Date of Patent: Dec. 9, 2025

(54) OPTIMIZING MEMORY USAGE IN PHYSICAL MEMORY

(71) Applicant: International Business Machines Corporation, Armonk, NY (US)

(72) Inventors: Vijay Sundaresan, North York (CA); Marius Pirvu, Toronto (CA); Gita Koblents, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/737,737

(22) Filed: Jun. 7, 2024

(51) Int. Cl.
*G06F 3/06* (2006.01)

(52) U.S. Cl.
CPC .......... *G06F 3/0613* (2013.01); *G06F 3/0638* (2013.01); *G06F 3/0673* (2013.01)

(58) Field of Classification Search
CPC ..... G06F 3/0613; G06F 3/0638; G06F 3/0673
See application file for complete search history.

(56) References Cited

U.S. PATENT DOCUMENTS

| | | | |
|---|---|---|---|
| 9,569,612 B2 | 2/2017 | Wilkerson et al. | |
| 9,935,975 B2 | 4/2018 | Wilkerson et al. | |
| 10,642,505 B1 | 5/2020 | Kuzmin et al. | |
| 2004/0268350 A1* | 12/2004 | Welland | G06F 9/3836 718/100 |
| 2015/0363326 A1* | 12/2015 | Baskakov | G06F 12/12 711/173 |
| 2015/0378628 A1* | 12/2015 | Golander | G06F 3/0647 711/162 |
| 2016/0034195 A1* | 2/2016 | Li | G06F 3/0659 711/117 |
| 2018/0024923 A1* | 1/2018 | Hassan | G06F 9/5016 711/203 |
| 2020/0142825 A1* | 5/2020 | Barczak | G06F 3/061 |
| 2023/0376423 A1* | 11/2023 | Li | G06F 3/0673 |
| 2024/0330187 A1* | 10/2024 | Xiang | G06F 12/0813 |

OTHER PUBLICATIONS

Al Maruf et al., "TPP: Transparent Page Placement for CXL-Enabled Tiered-Memory," Proceedings of the 28th ACM International Conference on Architectural Support for Programming Languages and Operating Systems, 2023, pp. 1-14, Association for Computing Machinery, accessed May 13, 2024, https://doi.org/10.1145/3582016.3582063.

(Continued)

*Primary Examiner* — Ryan Bertram
(74) *Attorney, Agent, or Firm* — Yee & Associates, P.C.

(57) ABSTRACT

A computer-implemented method for optimizing memory usage. A processor set classifies data stored in virtual memory into hot data and cold data based on frequency of access for the data stored in the virtual memory. The processor set segregates the hot data and the cold data into different memory regions in the virtual memory to generate hot memory regions comprising the hot data and cold memory regions comprising the cold data. The processor set maps the hot memory regions to large physical pages in memory pages of physical memory and the cold memory regions to small physical pages in the memory pages. The processor set disclaims data in the cold memory regions from the memory pages of physical memory to reduce memory space used in the physical memory.

20 Claims, 6 Drawing Sheets

(56) References Cited

OTHER PUBLICATIONS

Anonymous, "Employing Statistical Confidence Interval Estimation for DecisionMaking in Feedback Directed Optimization," ip.com Prior Art Database, Oct. 31, 2018, 9 pages, ip.com, accessed May 13, 2024, https://priorart.ip.com/IPCOM/000256035.
Anonymous, "Method and Apparatus for Dynamic Distribution of Data among Heterogeneous Memory Units," ip.com Prior Art Database, Jun. 1, 2010, 2 pages, ip.com, accessed May 13, 2024, https://priorart.ip.com/IPCOM/000196350.
Anonymous, "Methods and Techniques for Improving Endurance performance of DRAM-Like Persistent Memory using Multiple Bank-Density Architectures.," ip.com Prior Art Database, Sep. 20, 2021, 5 pages, ip.com, accessed May 13, 2024, https://priorart.ip.com/IPCOM/000267045.
Anonymous, "OS Memory Management Framework to Compute Large-PageUtilization Using Hardware Assist," ip.com Prior Art Database, May 22, 2023, 9 pages, ip.com, accessed May 13, 2024, https://priorart.ip.com/IPCOM/000272320.
Bergman et al., "Reconsidering OS Memory Optimizations in the Presence of Disaggregated Memory," Proceedings of the 2022 ACM SIGPLAN International Symposium on Memory Management (ISMM 2022), Jun. 14, 2022, 14 pages, acm.org, San Diego, California, United States, accessed May 13, 2024, https://doi.org/10.1145/3520263.3534650.
Bergner et al., "Performance Optimization and Tuning Techniques for IBM Power Systems Processors Including IBM POWER8," Aug. 2015, 274 pages, IBM Redbooks, accessed May 13, 2024, https://www.redbooks.ibm.com/abstracts/sg248171.html.

\* cited by examiner

OPTIMIZING MEMORY USAGE IN PHYSICAL MEMORY

BACKGROUND

The disclosure relates generally to managing memory and more specifically to optimizing memory to reduce set size that dictates physical memory use.

Computer memory is a fundamental component of modern computing systems. Computer memory plays a crucial role in the execution of programs and the storage of data. Computer memory can be volatile memory that loses contents when the power is turned off, or non-volatile memory that retains contents when the power is turned off.

Memory optimization is the process of efficiently managing and utilizing computer memory resources to enhance system performance and responsiveness. Such optimization involves various techniques and strategies aimed at minimizing memory usage, reducing memory access times, and maximizing the availability of memory for active processes and applications.

SUMMARY

According to one illustrative embodiment, a computer-implemented method for optimizing memory usage is provided. A processor set classifies data stored in virtual memory into hot data and cold data based on frequency of access for the data stored in the virtual memory. The processor set segregates the hot data and the cold data into different memory regions in the virtual memory to generate hot memory regions comprising the hot data and cold memory regions comprising the cold data. The processor set maps the hot memory regions to large physical pages in memory pages of physical memory and the cold memory regions to small physical pages in the memory pages. The processor set disclaims data in the cold memory regions from the memory pages of physical memory to reduce memory space used in the physical memory. According to other illustrative embodiments, a computer system, and a computer program product for optimizing memory usage are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
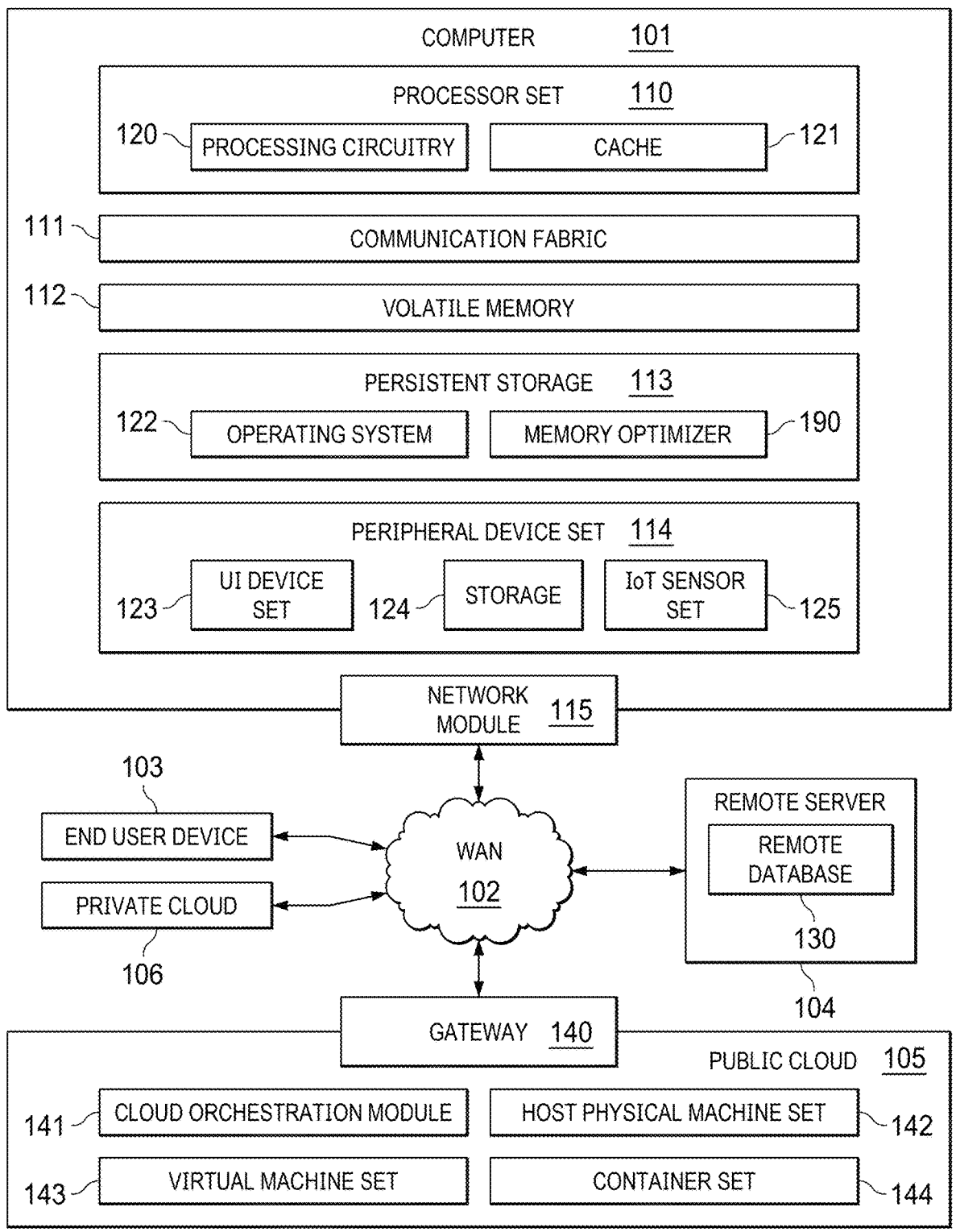
FIG. 1 is a pictorial representation of a computing environment in which illustrative embodiments may be implemented.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as memory optimizer 190. In addition to memory optimizer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and memory optimizer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in memory optimizer 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in memory optimizer 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that memory footprint is an important performance metric that can influence the cost of running applications in a computing environment.

The illustrative embodiments also recognize and take into account that current memory optimization techniques are fundamentally based on an exhaustive analysis that proves unreachability of the optimized memory. In addition, the illustrative embodiments also recognize and take into account that frequently accessed data and infrequently accessed data are not segregated in memory because the mapping between virtual memory and physical memory is done at page granularity. Therefore, as long as there is a single byte of data that is frequently accessed, the entire page will be designated as frequently accessed, which makes the disclaim operation of those pages not worthwhile.

Thus, illustrative embodiments of the present invention provide a computer implemented method, computer system, and computer program product for optimizing memory usage. In one illustrative example, a computer implemented method optimizes memory usage. A processor set classifies data stored in virtual memory into hot data and cold data based on frequency of access for the data stored in the virtual memory. The processor set segregates the hot data and the cold data into different memory regions in the virtual memory to generate hot memory regions comprising the hot data and cold memory regions comprising the cold data. The processor set maps the hot memory regions to large physical pages in memory pages of physical memory and the cold memory regions to small physical pages in the memory pages. The processor set disclaims data in the cold memory regions from the memory pages of physical memory to reduce memory space used in the physical memory.

Figure 2:
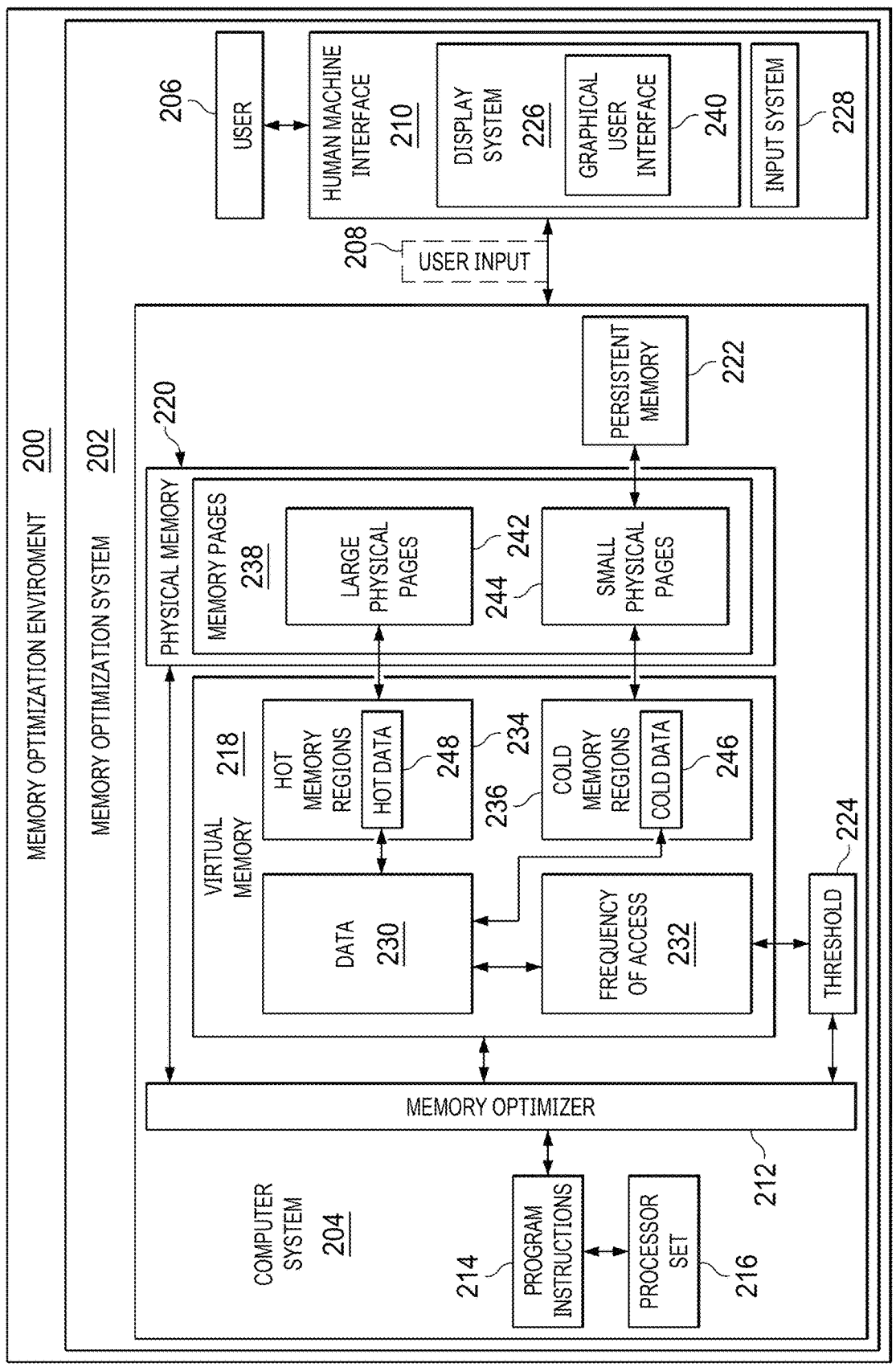
FIG. 2 is an illustration of a block diagram of a memory optimization environment in accordance with an illustrative embodiment.

With reference now to FIG. 2, an illustration of a block diagram of a memory optimization environment is depicted in accordance with an illustrative embodiment. In this illustrative example, memory optimization environment 200 includes components that can be implemented in hardware such as the hardware shown in computing environment 100 in FIG. 1.

In this illustrative example, memory optimization system 202 in memory optimization environment 200 optimizes memory usages to reduce memory space in physical memory. In this illustrative example, memory optimization system 202 includes computer system 204 which includes memory optimizer 212. Memory optimizer 212 is located in computer system 204. Memory optimizer 212 may be implemented using memory optimizer 190 in FIG. 1.

Memory optimizer 212 can be implemented in software, hardware, firmware, or a combination thereof. When software is used, the operations performed by memory optimizer 212 can be implemented in program instructions configured to run on hardware, such as a processor unit. When firmware is used, the operations performed by memory optimizer 212 can be implemented in program instructions and data and stored in persistent memory to run on a processor unit. When hardware is employed, the hardware can include circuits that operate to perform the operations in memory optimizer 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes virtual memory 218 and physical memory 220. In this illustrative example, virtual memory 218 is a mapping between virtual addresses used by a program or application in computer system 204 to physical addresses in hardware components such as physical memory 220 and persistent memory 222 in computer system 204. In this illustrative example, persistent memory 222 can be an example of persistent storage 113 in FIG. 1. On the other hand, physical memory 220 is the actual hardware component such as RAM (Random Access Memory), where data and programs are stored for quick access. In this illustrative example, physical memory 220 is volatile and loses contents when power is turned off.

Virtual memory 218 and physical memory 220 work together to manage memory usage in computer system 204. In this illustrative example, virtual memory 218 relies on physical memory 220 to function effectively. For example, when a program or application in computer system 204 accesses data, the operating system in conjunction with the processor translates virtual addresses into physical addresses before data is accessed. By using such method, computer system 204 provides memory isolation between different programs running concurrently and can handle more data and run larger applications than the memory limit provided by physical memory 220 alone.

In this illustrative example, memory optimizer 212 can classify data such as data 230 in virtual memory 218 to improve the efficiency of memory usage in computer system 204. For example, data 230 or a portion of data 230 can be classified into hot data 248 and cold data 246 based on frequency of access 232 for data 230. In this illustrative example, hot data 248 refers to the data that are frequently accessed by other programs and applications in computer system 204, and cold data 246 refers to the data that are infrequently accessed by other programs and applications in computer system 204. In this illustrative example, frequency of access 232 is a value that indicates how frequently data 230 or a portion of data 230 is accessed by other programs and applications in computer system 204. For example, frequency of access 232 can be 5 times within a minute, 10 times within an hour, 100 times within a day, or any suitable frequency for indicating how much times data is accessed by other programs and applications in computer system 204.

Memory optimizer 212 can classify data 230 or a portion of data 230 in a number of ways. For example, data 230 or a portion of data 230 can be classified based on static heuristics. In another example, data 230 or a portion of data 230 can also be classified based on dynamic information. In yet another example, data 230 or a portion of data 230 can be classified based on types of data for data 230 and a portion of data 230. In this illustrative example, data 230 can include different types of data, for example, data 230 can include compiled code, metadata associated with the compiled code, classes, object memory, or any suitable data.

For example, if data 230 or a portion of data 230 is compiled code, memory optimizer 212 can classify basic blocks in the compiled code into cold data 246 when those basic blocks contain an unresolved reference that suggests code did not run before it was compiled, or when compiler generates a slow path for speculative optimization.

In another example, basic blocks can also be classified into cold data 246 when such basic blocks are either dominated or post dominated by other basic blocks that are classified into cold data 246. In this illustrative example, basic blocks of compiled codes are straight-line sequence of instructions with no branches and domination between basic blocks refers to the relationship that one basic block's execution is conditioned on another execution of another basic block.

In another example, if data 230 or a portion of data 230 is metadata associated with compiled code, memory optimizer 212 can classify such metadata into cold data 246 when the compiled codes for the metadata are already classified into cold data 246. In this illustrative example, it is worth optimizing metadata separately because metadata can take up to half the size of actual compiled code and it is usually allocated and managed differently compared to compiled code.

In yet another example, memory optimizer 212 can also classify classes and object memory in virtual memory 218. Many classes are used early when programs are executed but are subsequently not used at all. In this example, it is possible to either do static analysis or collect dynamic information to determine which classes may not be used at a steady state. It is also possible to reorganize the runtime's representation of class or method data structures for classification. In a similar fashion, many objects are allocated during the start of a program but are only accessed infrequently after the program has reached a steady state.

In addition, memory optimizer 212 can determine threshold 224 for classification. In this illustrative example, data 230 or a portion of data 230 can be classified into hot data 248 when frequency of access 232 exceeds threshold 224. For example, threshold 224 can be a frequency of 10 times per minutes, which indicates that data 230 or a portion of data 230 can be classified into hot data 248 if frequency of access 232 exceeds 10 times per minutes. On the other hand, data 230 or a portion of data 230 can be classified into cold data 246 when frequency of access 232 does not exceed threshold 224. In a similar fashion, threshold 224 can be a frequency of 10 times per minutes, which indicates that data 230 or a portion of data 230 can be classified into cold data 246 if frequency of access 232 does not exceed 10 times per minutes. In this illustrative example, threshold 224 can be utilized with the classification methods mentioned above.

Memory optimizer 212 can also segregate data 230 in virtual memory 218 into different memory regions in virtual memory 218. For example, hot data 248 from data 230 can be placed into hot memory regions 234 and cold data 246 from data 230 can be placed into cold memory regions 236. In this illustrative example, memory optimizer 212 can segregate data 230 in virtual memory 218 into different memory regions in virtual memory 218 in a number of different ways. For example, compiled codes in data 230 consist of multiple compiled methods and each of the compiled method contains multiple basic blocks that can be classified into cold data 246. In this illustrative example, memory optimizer 212 can reorder the basic blocks that are classified into cold data 246 and group all basic blocks that are classified into cold data 246 together at the end of each compiled method.

In this illustrative example, hot memory regions 234 and cold memory regions 236 can be directly marked in the mapping for virtual memory 218 to indicate if a portion of data in virtual memory 218 is considered hot or cold. In an alternative example, memory optimizer 212 can create another data structure to record classifications of data as being hot data or cold data.

Compiled methods are usually placed one after another in a code cache. Therefore, basic blocks that are classified into cold data 246 can be dispersed across the entire code cache. Code cache is a collection of locations in virtual memory 218 for storing code generated by the compiler. In illustrative example, memory optimizer 212 can place all basic blocks that are classified into cold data 246 in one part of the code cache and all basic blocks that are classified into hot data 248 in another part of the code cache. In this illustrative example, memory optimizer 212 can write basic blocks into cold memory regions 236 and hot memory regions 234 accordingly.

In this illustrative example, memory pages 238 in physical memory 220 are fixed sized blocks of memory spaces on RAM. As depicted, memory pages 238 can be of different sizes such as small physical pages 244 and large physical pages 242. In this illustrative example, the size for small physical pages 244 can be 4 KB, or any suitable size for a small physical page and the size for large physical pages 242 can be 2 MB, 4 MB, 1 GB, or any suitable size for a large physical page.

In this illustrative example, memory optimizer 212 allocates memory regions in virtual memory 218 that will be filled with either cold data 246 or hot data 248 and instructs operating system to map hot memory regions 234 to large physical pages 242 of memory pages 238 in physical memory 220 and cold memory regions 236 to small physical pages 244 of memory pages 238 in physical memory 220. In other words, memory optimizer 212 allocates memory regions in virtual memory 218 such that only data in hot memory regions 234 are mapped to large physical pages 242 for storage and only data in cold memory regions 236 are mapped to small physical pages 244 for storage.

In this illustrative example, it should be understood that content from hot memory regions 234 and cold memory region 236 are not brought into physical memory 220 until computer system 204 attempts to write or read content from hot memory regions 234 and cold memory regions 236. In this illustrative example, a page fault will happen, and memory optimizer 212 creates a mapping between virtual memory 218 and memory pages 238 in physical memory 220. Subsequent reads or writes for the page will not incur page faults because the memory page is already backed by a physical page frame.

In this illustrative example, only using large physical pages 242 for data in hot memory regions 234 can improve runtime performance of applications because of reduced number of page faults for frequently accessed data. On the other hand, only using small physical pages 244 for data in cold memory regions 236 is not harmful for runtime performance because data in cold memory regions 236 is infrequently accessed.

In addition, when a small portion of data in cold memory region 236 is accessed, a full memory page is brought in from swap space or any other backing file and made resident in physical memory. Therefore, backing data in cold memory region 236 by large physical pages 242 can increase physical memory footprint with rarely accessed data and reduce the efficiency of disclaiming mechanism.

In this illustrative example, directing operating system in computer system 204 to use large physical pages 242 for data in hot memory regions 234 and to force the usage of small physical pages 244 for cold memory regions 236 can be done with operating system specific system calls. For example, madvise system call can be used for Linux operating system to provide a hint of MADV_HUGEPAGE or MADV_NOHUGEPAGE respectively.

Memory optimizer 212 can also disclaim data stored in cold memory regions 236 that is backed by small physical pages 244 of memory pages 238 to free memory spaces for physical memory 220. In other words, memory optimizer 212 can disclaim data in cold memory regions 236 to free memory spaces. In this illustrative example, disclaiming of data refers to a process of writing content of memory pages 238 in physical memory 220 to a non-volatile medium such as persistent memory 222 in order to free memory pages in memory 238 in physical memory 220. In this illustrative example, the disclaim operations can be performed through system calls. For example, the "madvise" system call on Linux operating system can be used to send a hint to indicate that address range will not be referenced soon and therefore the data in cold memory regions 236 can be saved to swap space (e.g., using MADV_PAGEOUT system call) or to a backing file (e.g., using MADV_DONTNEED system call or MADV_PAGEOUT system call).

In this illustrative example, memory optimizer 212 can disclaim data stored in small physical pages 244 of memory pages 238 at different time points. For example, memory optimizer 212 can disclaim small physical pages 244 of memory pages 238 when an application experiences a phase change. In this example, many applications have a distinct "start-up" phase that uses specific classes, methods, and data that are rarely needed afterwards.

In addition, virtual machines such as Java Virtual Machines (JVM) compile the bytecodes of frequently used methods into optimized machine code to improve performance. This compilation process is more intense during the initial part of an application's lifetime and gradually subsides over time. When the JVM has compiled the vast majority of methods that are classified into hot data 248, the performance stabilizes, and such stabilization loosely marks the end of the so called "ramp-up" phase. Since there are few methods being compiled beyond this point, the end of the "ramp-up" phase can also serve as a good point to perform a disclaim operation for compiled code, metadata, and classes in cold memory regions 236.

In another example, memory optimizer 212 can disclaim small physical pages 244 of memory pages 238 when a memory region becomes full. In yet another example, memory optimizer 212 can disclaim small physical pages 244 of memory pages 238 periodically in a predetermined time interval. In this illustrative example, because the detection of data for cold memory regions 236 is based on heuristics, some of these data along with the corresponding small physical pages can be brought back into resident memory in physical memory 220, which results in increase of the resident memory in physical memory 220 over time. Therefore, it is beneficial to perform disclaim operations periodically.

In this illustrative example, if programs and applications try to access data from the allocated memory region that are already disclaimed, the program will experience a page fault and the page that was missing will be brought back into physical memory 220. However, only pages that were accessed will be brought into physical memory 220, not the entire allocated memory region.

In this illustrative example, user 206 can interact with computer system 204 through user inputs to computer system 204. For example, computer system 204 can receive user input 208 that defines a value for threshold 224 or monitor the accuracy of classification for data 230 and disclaiming of small physical pages 244. In this example, user 206 can determine what portions of a previously disclaimed memory region in cold memory region 236 are brought back into resident memory in physical memory 220 before performing another disclaim operation. If a large portion of a cold memory region consistently becomes resident in physical memory 220, then user 206 can exclude the aforementioned cold memory region from the list of cold memory regions that are eligible for disclaiming.

In this illustrative example, user input 208 can be generated by user 206 using human machine interface (HMI) 210. As depicted, human machine interface 210 includes display system 226 and input system 228. Display system 226 is a physical hardware system and includes one or more display devices on which graphical user interface 240 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

In this example, user 206 is a person that can interact with graphical user interface 240 through user input 208 generated by input system 228. Input system 228 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

In one illustrative example, one or more solutions are present that overcome a problem with optimizing memory usage in physical memory. As a result, one or more technical solutions may provide an ability to increase the efficiency for utilizing memory in computer system 204.

In the illustrative example, computer system 204 can be configured to perform at least one of the steps, operations, or actions described in the different illustrative examples using software, hardware, firmware, or a combination thereof. As a result, computer system 204 operates as a special purpose computer system in which memory optimizer 212 in computer system 204 enables optimizing memory usage in physical memory 220. In particular, memory optimizer 212 transforms computer system 204 into a special purpose computer system as compared to currently available general computer systems that do not have a memory optimizer 212.

In the illustrative example, the use of memory optimizer 212 in computer system 204 integrates processes into a practical application for optimizing memory use to increase the performance of computer system 204. In other words, memory optimizer 212 in computer system 204 is directed to a practical application of processes integrated into memory optimizer 212 in computer system 204 that manages data based on frequency of access for the data to optimize memory usage in physical memory 220.

The illustration of memory optimization environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, threshold 224 can be automatically determined by memory optimizer based on historical threshold used for classification.

Figure 3:
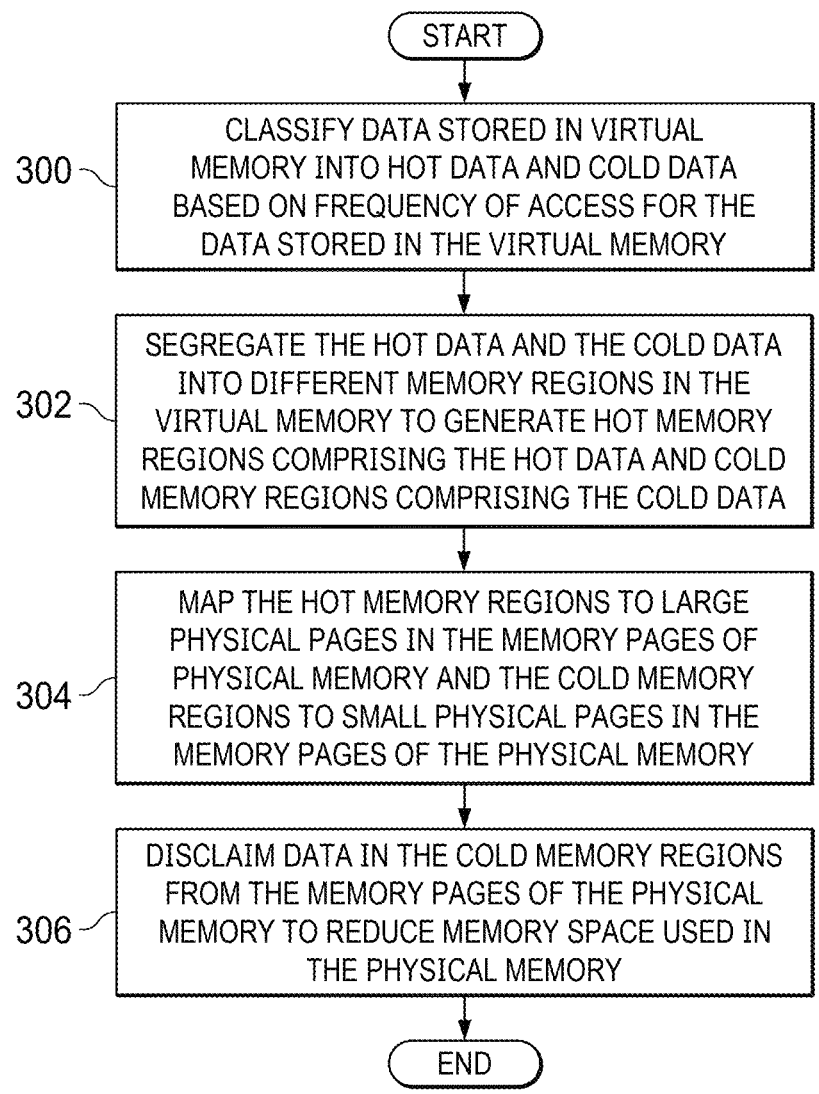
FIG. 3 is a flowchart of a process for optimizing memory usage in accordance with an illustrative embodiment.

With reference now to FIG. 3, a flowchart illustrating a process for optimizing memory usage is shown in accordance with an illustrative embodiment. The process in FIG. 3 can be implemented in hardware, software, or both. When implemented in software, the process can take the form of program instructions that are run by one or more processor units located in one or more hardware devices in one or more computer systems. For example, the process can be implemented in memory optimizer 212 in computer system 204 in FIG. 2.

The process begins by classifying data stored in virtual memory into hot data and cold data based on frequency of access for the data stored in the virtual memory (step 300). The process segregates the hot data and the cold data into different memory regions in the virtual memory to generate hot memory regions comprising the hot data and cold memory regions comprising the cold data (step 302). The process maps the hot memory regions to large physical pages in the memory pages of physical memory and the cold memory regions to small physical pages in the memory pages of the physical memory (step 304). The process disclaims data in the cold memory regions from the memory pages of the physical memory to reduce memory space used in the physical memory (step 306). The process terminates thereafter.

Figure 4:
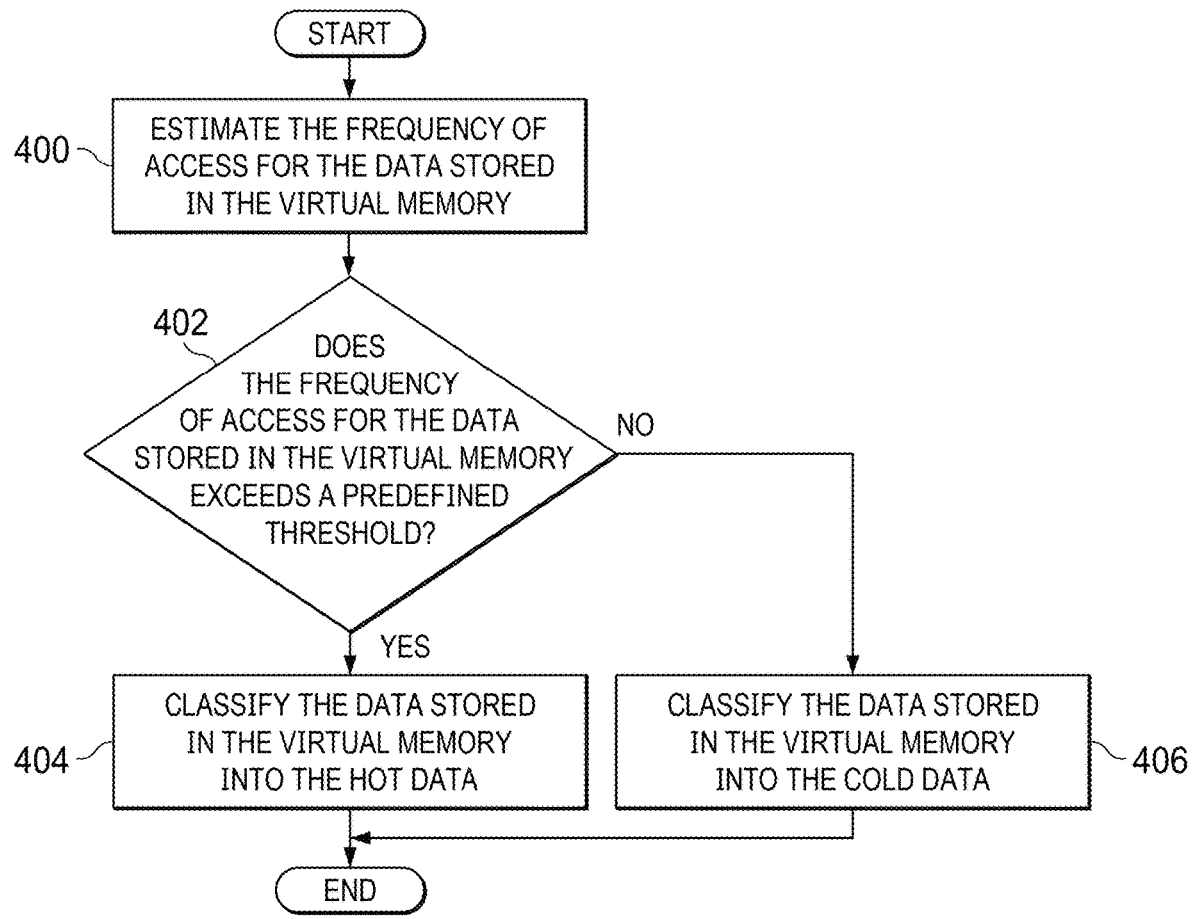
FIG. 4 is a flowchart of a process for classifying data for memory usage in accordance with an illustrative embodiment.

Turning next to FIG. 4, a flowchart of a process for classifying data for memory usage is depicted in accordance with an illustrative embodiment. The process in this flowchart is an example of an implementation for step 300 in FIG. 3.

The process begins by estimating the frequency of access for the data stored in the virtual memory (step 400). The process determines whether the frequency of access for the data stored in the virtual memory exceeds a predefined threshold (step 402). In step 402, the determination can be performed for all data stored in the virtual memory or just a portion of data stored in the virtual memory. In response to determining that the frequency of access for the data stored in the virtual memory exceeds the predefined threshold, the process classifies the data stored in the virtual memory into the hot data (step 404). The process terminates thereafter.

With reference again to step 402, if the frequency of access for the data stored in the virtual memory does not exceed the predefined threshold, the process classifies the data stored in the virtual memory into the cold data (step 406). The process terminates thereafter.

Figure 5:
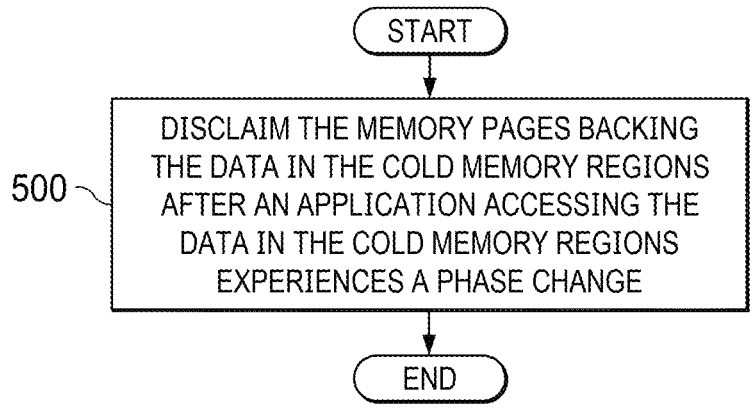
FIG. 5 is a flowchart of a process for disclaiming memory pages in accordance with an illustrative embodiment.

Turning next to FIG. 5, a flowchart of a process for disclaiming memory pages is depicted in accordance with an illustrative embodiment. The process in this flowchart is an example of an implementation for step 306 in FIG. 3. The process in this figure is an example of an additional step that can be performed with the steps in FIG. 4.

The process begins by disclaiming the memory pages backing the data in the cold memory regions after an application accessing the data in the cold memory regions experiences a phase change (step 500). The process terminates thereafter.

Figure 6:
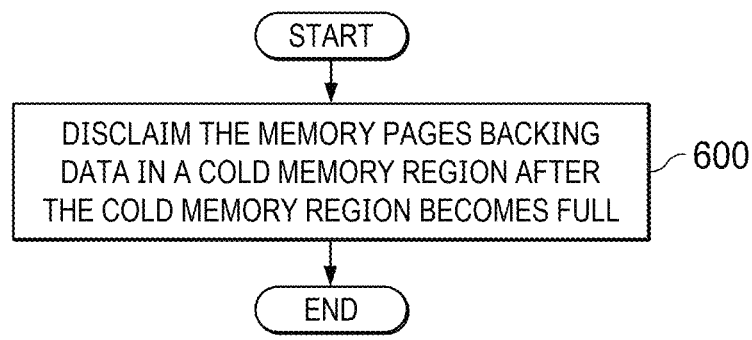
FIG. 6 is a flowchart of a process for disclaiming memory pages in accordance with an illustrative embodiment.

Turning next to FIG. 6, a flowchart of a process for disclaiming memory pages is depicted in accordance with an illustrative embodiment. The process in this flowchart is an example of an implementation for step 306 in FIG. 3.

The process begins by disclaiming the memory pages backing data in a cold memory region after the cold memory region becomes full (step 600). The process terminates thereafter.

Figure 7:
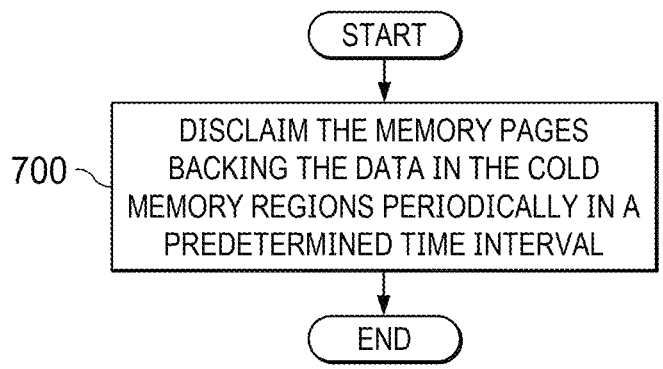
FIG. 7 is a flowchart of a process for disclaiming memory pages in accordance with an illustrative embodiment.

Turning next to FIG. 7, a flowchart of a process for disclaiming memory pages is depicted in accordance with an illustrative embodiment. The process in this flowchart is an example of an implementation for step 306 in FIG. 3.

The process begins by disclaiming the memory pages backing the data in the cold memory regions periodically in a predetermined time interval (step 700). The process terminates thereafter.

Figure 8:
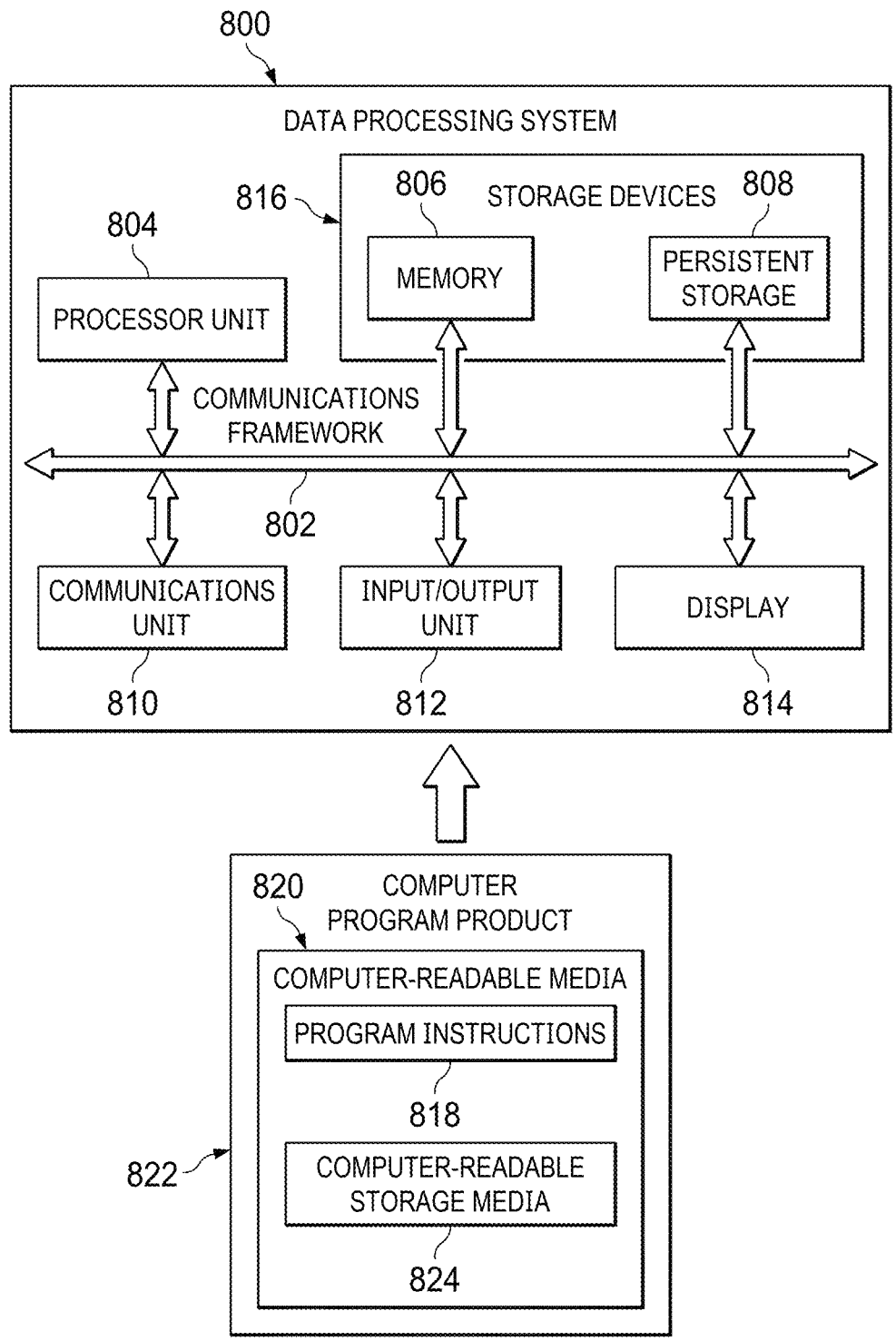
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement computers and computing devices in computing environment 100 in FIG. 1. Data processing system 800 can also be used to implement computer system 204 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 804 can be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program instructions, computer usable program instructions, or computer-readable program instructions that can be read and executed by a processor in processor unit 804. The program instructions in the different embodiments can be embodied on different physical or computer-readable storage media, such as memory 806 or persistent storage 808.

Program instructions 818 are located in a functional form on computer-readable media 820 that is selectively removable and can be loaded onto or transferred to data processing system 800 for execution by processor unit 804. Program instructions 818 and computer-readable media 820 form computer program product 822 in these illustrative examples. In the illustrative example, computer-readable media 820 is computer-readable storage media 824.

Computer-readable storage media 824 is a physical or tangible storage device used to store program instructions 818 rather than a medium that propagates or transmits program instructions 818. Computer-readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 818 can be transferred to data processing system 800 using a computer-readable signal media. The computer-readable signal media are signals and can be, for example, a propagated data signal containing program instructions 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program instructions 818 can be located in computer-readable media 820 in the form of a single storage device or system. In another example, program instructions 818 can be located in computer-readable media 820 that is distributed in multiple data processing systems. In other words, some instructions in program instructions 818 can be located in one data processing system while other instructions in program instructions 818 can be located in one data processing system. For example, a portion of program instructions 818 can be located in computer-readable media 820 in a server computer while another portion of program instructions 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program instructions 818.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for optimizing memory usage, the computer implemented method comprising:
   classifying, by a processor set, data stored in virtual memory into hot data and cold data based on frequency of access for the data stored in the virtual memory, wherein metadata from the data are classified into the cold data when compiled codes associated with the metadata are already classified into the cold data, and wherein the compiled codes associated with the metadata comprise unresolved references associated with codes that did not run before the compilation;
   segregating, by the processor set, the hot data and the cold data into different memory regions in the virtual memory to generate hot memory regions comprising the hot data and cold memory regions comprising the cold data;
   mapping, by the processor set, the hot memory regions to large physical pages in memory pages of physical memory and the cold memory regions to small physical pages in the memory pages of the physical memory; and
   disclaiming, by the processor set, data in the cold memory regions from the memory pages of the physical memory to reduce memory space used in the physical memory.

2. The computer implemented method of claim 1, wherein classifying, by the processor set, the data stored in the virtual memory into the hot data and the cold data based on the frequency of access for the data stored in the virtual memory comprises:
   estimating, by the processor set, the frequency of access for the data stored in the virtual memory;
   determining, by the processor set, whether the frequency of access for the data stored in the virtual memory exceeds a predefined threshold;
   in response to determining that the frequency of access for the data stored in the virtual memory exceeds the predefined threshold, classifying, by the processor set, the data stored in the virtual memory into the hot data; and
   in response to determining that the frequency of access for the data stored in the virtual memory does not exceed the predefined threshold, classifying, by the processor set, the data stored in the virtual memory into the cold data.

3. The computer implemented method of claim 1, wherein disclaiming, by the processor set, the data in the cold memory regions from the memory pages of physical memory to reduce the memory space used in the physical memory comprises:
   disclaiming, by the processor set, the memory pages backing the data in the cold memory regions after an application accessing data in the cold memory regions experiences a phase change.

4. The computer implemented method of claim 1, wherein disclaiming, by the processor set, the data in the cold memory regions from the memory pages of physical memory to reduce the memory space used in the physical memory comprises:
   disclaiming, by the processor set, the memory pages backing data in a cold memory region after the cold memory region becomes full.

5. The computer implemented method of claim 1, wherein disclaiming, by the processor set, the data in the cold memory regions from the memory pages of physical memory to reduce the memory space used in the physical memory comprises:
   disclaiming, by the processor set, the memory pages backing the data in the cold memory regions periodically in a predetermined time interval.

6. The computer implemented method of claim 1, wherein the compiled codes are associated with slow paths for speculative optimization generated by a compiler.

7. The computer implemented method of claim 1, wherein basic blocks of the compiled codes are dominated or post dominated by other basic blocks that are classified into the cold data.

8. A computer system comprising:
   a processor set;
   a set of one or more computer-readable storage media; and
   program instructions, collectively stored in the set of one or more storage media, for causing the processor set to perform the following computer operations:

classify data stored in virtual memory into hot data and cold data based on frequency of access for the data stored in the virtual memory, wherein metadata from the data are classified into the cold data when compiled codes associated with the metadata are already classified into the cold data, and wherein the compiled codes associated with the metadata comprise unresolved references associated with codes that did not run before the compilation;

segregate the hot data and the cold data into different memory regions in the virtual memory to generate hot memory regions comprising the hot data and cold memory regions comprising the cold data;

map the hot memory regions to large physical pages in memory pages of physical memory and the cold memory regions to small physical pages in the memory pages of the physical memory; and disclaim data in the cold memory regions from the memory pages of the physical memory to reduce memory space used in the physical memory.

9. The computer system of claim 8, wherein as part of classifying the data stored in the virtual memory into the hot data and the cold data based on the frequency of access for the data stored in the virtual memory, the program instructions, collectively stored in the set of one or more storage media, cause the processor set to perform the following computer operations:

estimate the frequency of access for the data stored in the virtual memory;

determine whether the frequency of access for the data stored in the virtual memory exceeds a predefined threshold;

in response to determining that the frequency of access for the data stored in the virtual memory exceeds the predefined threshold, classify the data stored in the virtual memory into the hot data; and in response to determining that the frequency of access for the data stored in the virtual memory does not exceed the predefined threshold, classify the data stored in the virtual memory into the cold data.

10. The computer system of claim 8, wherein as part of disclaiming the data in the cold memory regions from the memory pages of the physical memory to reduce the memory space used in the physical memory, the program instructions, collectively stored in the set of one or more storage media, cause the processor set to perform the following computer operations:

disclaim the memory pages backing the data in the cold memory regions after an application accessing the data in the cold memory regions experiences a phase change.

11. The computer system of claim 8, wherein as part of disclaiming the data in the cold memory regions from the memory pages of the physical memory to reduce the memory space used in the physical memory, the program instructions, collectively stored in the set of one or more storage media, cause the processor set to perform the following computer operations:

disclaim the memory pages backing data in a cold memory region after the cold memory region becomes full.

12. The computer system of claim 8, wherein as part of disclaiming the data in the cold memory regions from the memory pages of the physical memory to reduce the memory space used in the physical memory, the program instructions, collectively stored in the set of one or more storage media, cause the processor set to perform the following computer operations:

disclaim the memory pages backing the data in the cold memory regions periodically in a predetermined time interval.

13. The computer system of claim 8, wherein the compiled codes are associated with slow paths for speculative optimization generated by a compiler.

14. The computer system of claim 8, wherein basic blocks of the compiled codes are dominated or post dominated by other basic blocks that are classified into the cold data.

15. A computer program product for optimizing memory usage, the computer program product comprising:

a set of one or more computer-readable storage media;

program instructions, collectively stored in the set of one or more storage media, cause a processor set to perform the following computer operations:

classify data stored in virtual memory into hot data and cold data based on frequency of access for the data stored in the virtual memory, wherein metadata from the data are classified into the cold data when compiled codes associated with the metadata are already classified into the cold data, and wherein the compiled codes associated with the metadata comprise unresolved references associated with codes that did not run before the compilation;

segregate the hot data and the cold data into different memory regions in the virtual memory to generate hot memory regions comprising the hot data and cold memory regions comprising the cold data;

map the hot memory regions to large physical pages in memory pages of physical memory and the cold memory regions to small physical pages in the memory pages of the physical memory; and disclaim data in the cold memory regions from the memory pages of the physical memory to reduce memory space used in the physical memory.

16. The computer program product of claim 15, wherein as part of classifying the data stored in the virtual memory into the hot data and the cold data based on the frequency of access for the data stored in the virtual memory, the operation performed by the processor set comprises:

estimate the frequency of access for the data stored in the virtual memory;

determine whether the frequency of access for the data stored in the virtual memory exceeds a predefined threshold;

in response to determining that the frequency of access for the data stored in the virtual memory exceeds the predefined threshold, classify the data stored in the virtual memory into the hot data; and in response to determining that the frequency of access for the data stored in the virtual memory does not exceed the predefined threshold, classify the data stored in the virtual memory into the cold data.

17. The computer program product of claim 15, wherein as part of disclaiming the data in the cold memory regions from the memory pages of the physical memory to reduce the memory space used in the physical memory, the operation performed by the processor set comprises:

disclaim the memory pages containing the data in the cold memory regions after an application accessing the data in the cold memory regions experiences a phase change.

18. The computer program product of claim 15, wherein as part of disclaiming the data in the cold memory regions from the memory pages of the physical memory to reduce the memory space used in the physical memory, the operation performed by the processor set comprises:
  disclaim the memory pages backing data in a cold memory region after the cold memory region becomes full.

19. The computer program product of claim 15, wherein as part of disclaiming the data in the cold memory regions from the memory pages of the physical memory to reduce the memory space used in the physical memory, the operation performed by the processor set comprises:
  disclaim the memory pages backing the data in the cold memory regions periodically in a predetermined time interval.

20. The computer program product of claim 15, wherein the compiled codes are associated with slow paths for speculative optimization generated by a compiler.

* * * * *